J. W. ANDERSON.
Insect-Traps.
No. 137,588. Patented April 8, 1873.
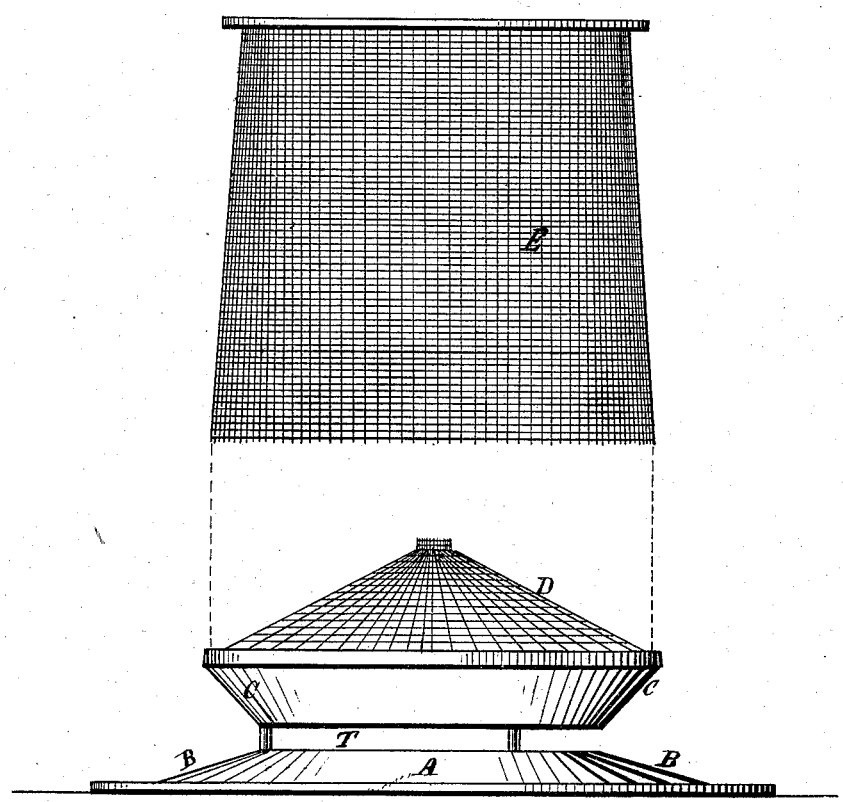

UNITED STATES PATENT OFFICE.

JOHN W. ANDERSON, OF PORTLAND, INDIANA.

IMPROVEMENT IN INSECT-TRAPS.

Specification forming part of Letters Patent No. 137,588, dated April 8, 1873; application filed October 25, 1872.

*To all whom it may concern:*

Be it known that I, JOHN W. ANDERSON, of Portland, in the county of Jay and State of Indiana, have invented certain Improvements in Insect-Traps, of which the following is a specification:

The drawing presents a front elevation of the trap.

E is a chamber of wire-cloth or other suitable material. D is a cone, also of wire-cloth, with a hole at the top large enough to permit a fly to pass upward. At the bottom of the chamber E is a rim or flange, C, turning inward and downward. On the bottom plate A is another flange, B, turning inward and upward, the inside corresponding in size with the flange C. The flanges B and C are kept just about far enough apart at their inner edges to permit a fly to pass through between them. The flanges B and C are kept in their relative positions to each other by studs or partitions fastened between them, or any convenient arrangement to keep them the right distance apart. The lower flange B is attached to the bottom plate A by any convenient device, allowing it to be removed to place the bait.

The bait is placed on the bottom plate at A. The flies pass in through the opening between the flanges at T. When the insects are inside, as there is nothing for them to walk on leading to the opening T, they will usually fly up into the cone D and pass up into the chamber E; but if they should run over the flanges B or C, they will not turn the abrupt angle necessary to pass out, but will pass over the opening T and eventually find their way up into the chamber E.

I make no claim to the cone D or chamber E, as I am aware that they are not new.

What I claim as my invention is—

1. In combination with the chamber E, the flanges B and C, constructed substantially as and for the purposes set forth.

2. The combination of the bottom plate A, flanges B and C, the cone D, and chamber E, constructed substantially as and for the purposes specified.

JOHN WESLEY ANDERSON.

Witnesses:
J. C. PUMPHREY,
HARRY ADAIR.